United States Patent [19]
Nash

[11] Patent Number: 5,315,333
[45] Date of Patent: May 24, 1994

[54] CAMERA LENS SHIELD

[76] Inventor: Michael Nash, 6621 Arozena La., Carpinteria, Calif. 93013

[21] Appl. No.: 69,733

[22] Filed: Jun. 1, 1993

[51] Int. Cl.[5] .............................................. G03B 17/00
[52] U.S. Cl. ..................... 354/202; 359/508
[58] Field of Search ................ 359/507, 508, 511; 354/202, 295

[56] References Cited

U.S. PATENT DOCUMENTS

| | | | |
|---|---|---|---|
| 1,153,945 | 9/1915 | Mustin | 359/508 |
| 1,304,548 | 5/1919 | DeNormanville | 359/508 |
| 2,298,063 | 10/1942 | MacPherson | 359/508 |
| 3,942,863 | 3/1976 | Schuwerk | 359/508 |
| 4,414,576 | 11/1983 | Randmae | 358/229 |

Primary Examiner—David M. Gray
Attorney, Agent, or Firm—Marvin E. Jacobs

[57] ABSTRACT

Apparatus to spin a glass window in front of a camera lens so as to centrifugally throw off water and dirt. The window rotates in a pair of parallel bearing races at its circumference. Impeller blades between the bearing races spin with the window to force air through the bearings and prevent entry of contamination into the bearing races. The apparatus is mounted directly to the camera to isolate the lens from gyroscopic and vibrational forces.

8 Claims, 1 Drawing Sheet

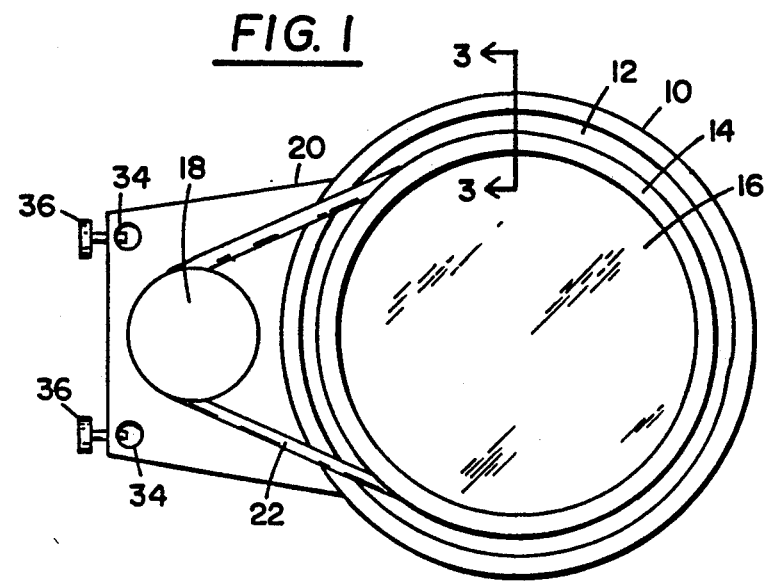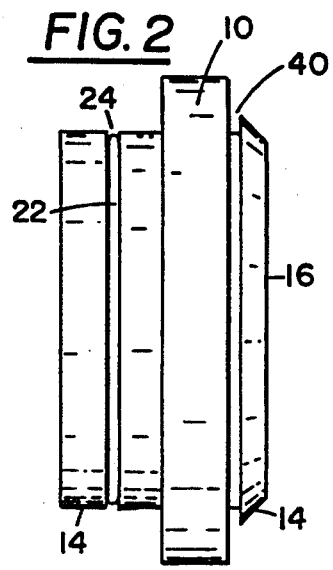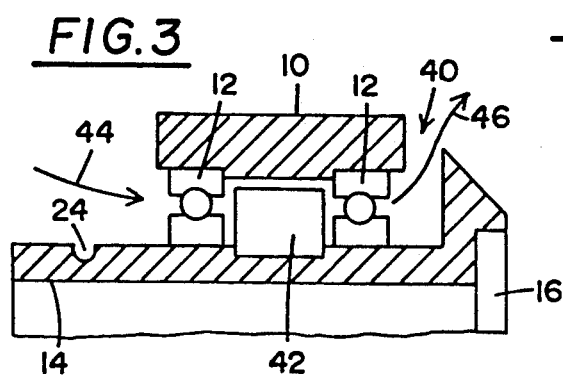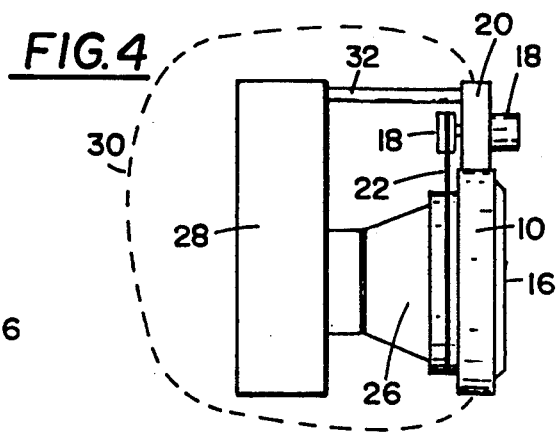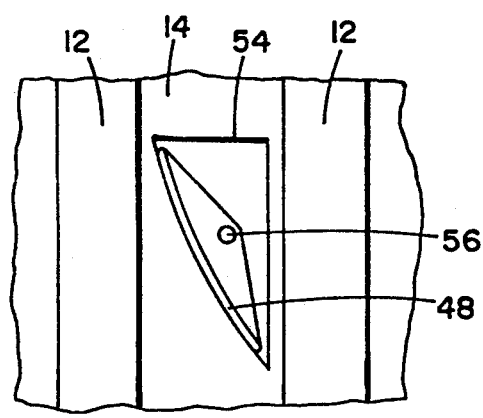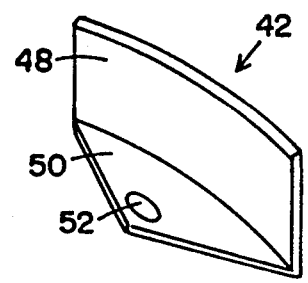

CAMERA LENS SHIELD

DESCRIPTION

1. Technical Field

This invention relates to the camera arts, especially transparent lens shields that are disposed in front of the lens and caused to spin so as to centrifugally shed water.

2. Background of the Invention

It is often necessary to operate video, movie, or other type cameras in rain, water spray, and other dirty environments that deposit spots and drops of water on the lens. These water drops and spots reduce the light entering the lens and, in some circumstances, can even be seen by the camera. To avoid this problem, the prior art has proposed a variety of spinning glass plates positioned in front of the lens. Any water or other contamination that lands on the glass plate is instantly thrown off by the spinning motion. Examples of this may be found in U.S. Pat. No. 1,153,945 to Mustin and U.S. Pat. No. 2,298,063 to MacPherson. Similar techniques are used to keep rear view mirrors clean such as shown by U.S. Pat. No. 3,942,863 to Schuwerk.

These designs rotate the glass plate about a center pivot that limits the amount of glass available for the camera to view through. The prior art has solved this problem too with more compact designs in which the glass is supported by a bearing race around the circumference and edge driven so that the entire spinning glass surface is available to the camera. Normanville, U.S. Pat. No. 1,304,548, for example, shows an edge supported and driven glass spray guard in which a jet of pressurized air is used to spin the glass. Other prior art designs use motor driven gears to engage the edge of the spinning glass such as shown in Japan Patent 59-124,324 to Tsukamoto and German patent DE 29 01 982 by Helfrich.

The problem with edge driven spinning shields is that the bearing race at the edge is exposed to the water and contamination as well. A certain minimum gap must be maintained at the bearing to insure clearance for the spinning shield. This gap can admit water and dirt. Furthermore, water and dirt shed from the spinning glass tends to accumulate at the edge near the gap. Water and dirt that reach the bearing cause it to slow down and eventually damage the bearing race. The present invention avoids this problem.

STATEMENT OF THE INVENTION

Briefly, this invention utilizes a spinning glass window mounted within a cylindrical glass support. The glass support is located in front of the camera lens, but not supported by the lens itself. Instead, the glass support cylinder is supported by the camera body so as to isolate the lens from the vibration and torques of the spinning cylinder. The glass support cylinder rotates within a pair of parallel, circumferential ball bearing races, which races, in turn, sit within a surrounding ring that structurally connects to the camera body. A water proof bag or shroud encloses the camera and fastens to the outside of the surrounding ring so as to leave exposed only the spinning glass. A small motor on the surrounding ring spins the cylindrical glass support by means of a belt drive that encircles the cylinder and a pulley on the motor.

To guarantee that no contamination can reach the parallel bearings, several small fan blades or impellers are mounted on the outside circumference of the cylindrical glass support and between the two bearings so as to rotate therewith. These impellers draw air from inside the shroud, through the inner bearing race, and force the air out the outer bearing race. This produces a steady flow of air outward from the external gap between the surrounding ring and the rotating cylinder, which flow prevents the entry of any external water or dirt into the bearings. Additional benefits and advantages are explained in the detailed description that follows and the drawings referenced thereby.

BRIEF DESCRIPTION OF THE DRAWINGS

FIG. 1 is an elevational view of the spinning glass lens shield and the support therefor, as seen from the camera side.

FIG. 2 is a view of the FIG. 1 apparatus as seen from the right side in FIG. 1.

FIG. 3 is an enlarged fragmentary sectional detail, taken on line 3—3 in FIG. 1, showing the impeller between the bearing races and the air flow path.

FIG. 4 is a diagram showing how the shroud encloses the camera and how the lens shield is supported directly by the camera body.

FIG. 5 is a detail showing an impeller in perspective.

FIG. 6 is a fragmentary detail showing the impeller mounted to the outside of the cylindrical glass support as it would appear from the top of FIG. 3.

DETAILED DESCRIPTION OF THE INVENTION

Referring to FIGS. 1 and 2, a surrounding, ring shaped, outer housing 10 is shown that retains a pair of bearing races 12 against the interior surface thereof. A cylindrical glass support 14 is mounted for rotation in bearings 12. A glass window 16 is tightly affixed to cylinder 14 so as to spin therewith and shed all water and contamination.

To provide motive power, a motor and pulley 18 is mounted on a suitable extension 20 connected to ring 10. A drive belt 22, from motor and pulley 18, rides in a groove 24 in the periphery of cylindrical glass support 14. In use, the cylinder 14 and glass 16 spin up to 3000 RPM so as to positively remove all water from the front of the glass 16.

As can be seen in FIG. 4, the lens shield is mounted directly in front of a lens 26 on a camera 28. However, the shield does not contact lens 26. Lens 26 merely fits within cylinder 14, close to spinning glass 16, but not in contact. In this way, physical isolation is maintained. The vibration of the spinning lens shield must not be transferred through the lens 26. Also, the gyroscopic forces caused by the high speed spinning could torque the lens out of alignment if the shield contacted the lens. Hence, ring support 10 is mounted directly to the camera body. One good way to do this is with steel rods 32 that extend out from camera 28, into holes 34 in extension 20. The lens shield can be slid in and out on rods 32 to the desired position, and locked in place with thumb screws 36. A water tight shroud, shown schematically by dashed line 30 in FIG. 4, encloses the camera and fits tightly to the outside of ring 10 and extension 20, possibly with Velcro or other suitable means.

In the sectional detail of FIG. 3, it may be seen that cylindrical glass support 14 is mounted for rotation within ring 10 by means of two parallel ball bearing races 12. A clearance gap 40 must be maintained to avoid contact between the stationary ring 10 and the high speed spinning cylinder 14. Water and dirt can enter gap 40 and slow or damage bearings 12. To prevent entry of water and contamination, the present invention generates a continuous flow of air out of gap 40 with a plurality of impellers or fan blades 42. The impellers 42 are secured to the outside circumference of cylinder 14, in the space between the bearing races 12, so as to rotate therewith at a high speed. Air is drawn from the inside of shroud 30, through the inside bearing 12 as indicated by arrow 44. The air is then exhausted, between the balls of the exterior bearing race 12, and out gap 40, as shown by arrow 46. Three impellers 42 have been found to work well, although other numbers may be used also.

A typical impeller 42 is shown in FIG. 5 and comprises a curved air scoop portion 48 and a mounting flange 50 with a screw hole 52. The high speed rotation of cylinder 14 produces powerful centrifugal forces and vibration on impellers 42. To insure a secure connection, FIG. 6 shows a generally triangular recess 54 in the outside surface of cylinder 14 within which impeller 42 is fastened down with a screw 56. Recess 54 guarantees the proper positioning of air scoop 48 relative to the bearing races 12 on each side. Recess 54 also lowers mounting screw 56 and allows a taller impeller 42 without interfering with the ring housing 10.

Numerous variations that do not depart from the spirit and scope of the invention are possible. Drive systems other than belt 22 may be used. Different bearing configurations are possible provided that the impellers 42 are located close enough to keep air flowing out of gap 40. Hence, limitation is intended only in accordance with the appended claims and their equivalents.

I claim:

1. A camera lens shield comprising in combination:
   a generally ring shaped bearing housing;
   bearing means disposed within said bearing housing;
   a generally cylindrical window support means mounted for rotation within said bearing means, said support means having a transparent window therein;
   moving means on said housing adapted to spin said support means fast enough to centrifugally shed contamination from the surface of said window; and
   impeller blade means on said support means at a location proximate said bearing means so as to flow air through the bearing means and prevent the entry of contamination into the bearing means.

2. The shield of claim 1 in which said bearing means comprises two parallel bearing races and said impeller means are located between the two races.

3. The shield of claim 2 in which said impeller blade means comprise a plurality of individual blades mounted in recesses in the outside circumference of said cylindrical support means.

4. The shield of claim 3 in which said housing is adapted to be mounted directly to a camera body.

5. The shield of claim 1 in which said moving means comprises a motor driven pulley attached to said housing with a belt connecting the pulley to a groove in the outside circumference of said cylindrical window support means.

6. The shield of claim 5 in which said bearing means comprises two parallel bearing races and said impeller means are located between the two races.

7. The shield of claim 6 in which said impeller blade means comprise a plurality of individual blades mounted in recesses in the outside circumference of said cylindrical support means.

8. The shield of claim 7 in which said housing is adapted to be mounted directly to a camera body.

* * * * *